Jan. 16, 1968  L. A. NEVARD  3,363,887
TANK AND FURNACE WALLS
Filed April 6, 1965  2 Sheets-Sheet 1
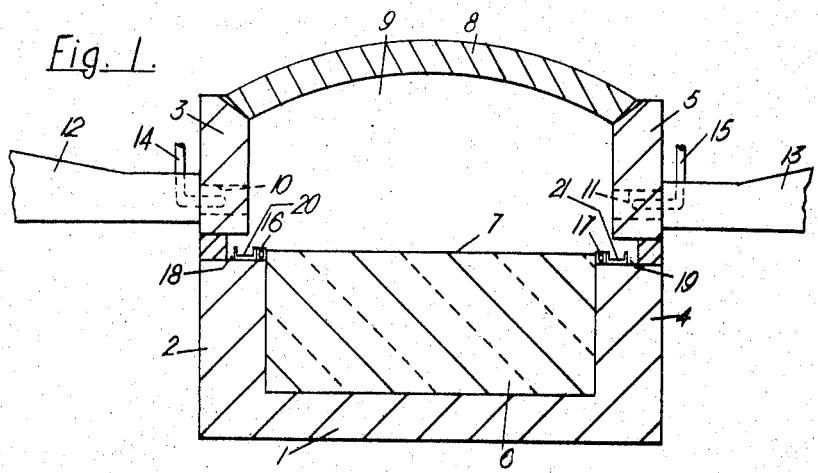
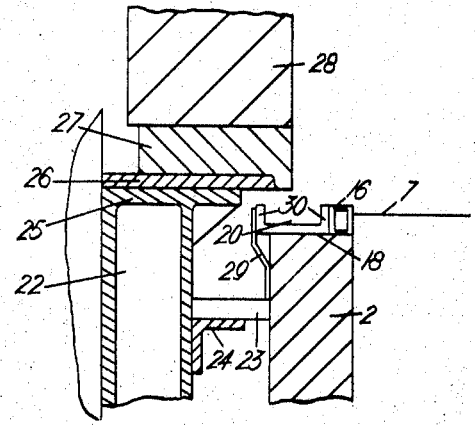
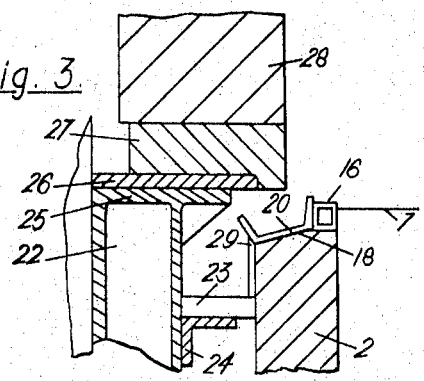
Inventor
L. A. Nevard
By
Morrison Kennedy Campbell
Attorneys

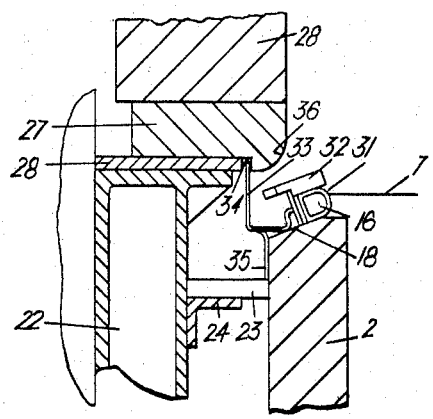
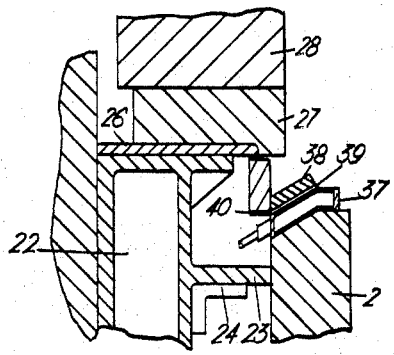
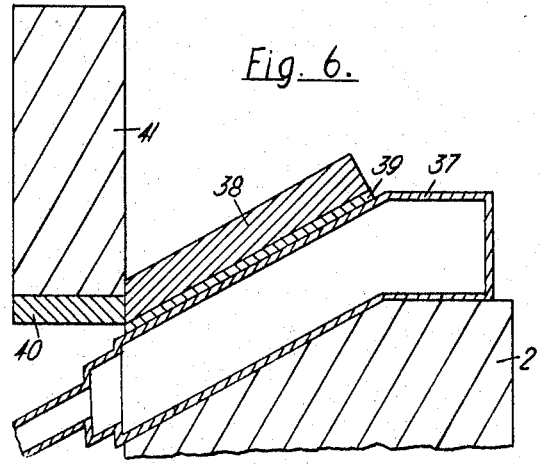

United States Patent Office 3,363,887
Patented Jan. 16, 1968

3,363,887
TANK AND FURNACE WALLS
Leslie Alan Nevard, Liverpool, England, assignor to Pilkington Brothers Limited, Liverpool, England, a corporation of Great Britain
Filed Apr. 6, 1965, Ser. No. 446,025
Claims priority, application Great Britain, Apr. 9, 1964, 14,781/64
10 Claims. (Cl. 263—11)

The present invention relates to tanks or furnaces for holding liquids at a high temperature, for example a temperature in the region of 1,000° C. and above, in particular to tanks and furnaces for holding molten glass, for example a glass melting furnace.

The liquid in a tank of this kind can be contaminated by impurities, such as bits and particles of the tank wall, or other matter released from the inside of the tank wall, due to corrosions of the tank wall dropping down into the liquid. The higher the temperature in the tank the greater is this tendency for the tank wall to corrode.

In a conventional glass melting and fining tank, the tank is constructed of refractory blocks and molten glass is maintained at a substantially constant level in the tank by continuously feeding granular glass forming materials on to the glass surface at one end of the tank at a rate commensurate with the rate of tapping off glass from the other end of the tank. Such glass melting tanks are often heated by burners arranged above the surface of the glass in the side walls of the tank, and the temperature of the glass exceeds 1,000° C.

In such a glass melting tank there is a relatively high headspace above the glass level to allow effective use of the burners. This means that a relatively large wall area of refractory material inside the tank and above the level of the surface of the molten glass is exposed to scouring by the hot strong gas flows created by the burner system, to scouring by particles carried by the hot gases, and to attack by chemical reaction with particles of glass forming material or the condensates of vapours blown against the wall by the strong gas currents. The high operating temperature makes the refractory blocks sensitive to such attacks.

More recently electrocast refractory materials have been used in the construction of glass melting tanks, but, for at least the first few weeks of operation of a tank, such materials exude a glassy matrix which is an undesirable contaminant of the molten glass, and which may fall into and contaminate the molten glass.

It is a main object of the present invention to provide an improved tank or furnace for holding a liquid at a high temperature, which avoids contamination of the liquid by impurities falling from the side walls of the tank or furnace.

A further object of the present invention is to provide an improved glass melting tank in which contamination of the molten glass by impurities falling from the inside surfaces of the walls of the tank, is minimised.

According to the invention there is provided a tank for holding a liquid, for example molten glass, at a high temperature, wherein the walls of the tank include means arranged inside the tank to catch any impurity falling from the walls thereby preventing that impurity from contaminating the liquid in the tank.

Preferably according to the invention said catching means is arranged in the region of the surface level of the liquid in the tank.

The invention also provides a glass melting tank wherein the side walls of the tank have a stepped formation in the region of the surface level of molten glass in the tank and said catching means is arranged on the step so formed along each side wall of the tank. The catching means may be fixed in the tank structure which is so arranged in the region of the step that there is access to the catching means for clearing away deposits which accumulate on the catching means. Alternatively the catching means may be detachably held in the tank side wall so that it can be removed for cleaning and replacement or other maintenance operations.

In some glass melting tanks it is desirable to confine the edges of the surface of the molten glass by water boxes extending along the tank side walls, and one embodiment of the invention provides a glass melting tank including water boxes extending longitudinally of the tank on each of said steps, which water boxes are engaged by the surface of the molten glass, and wherein catching means is mounted on each of the steps behind the water box on that step.

Preferably each catching means consists of an upwardly opening channel member so located on the step that the inner surface of the upper part of the tank side wall overhangs the channel member.

In a modified construction according to the invention the surface of the step slopes downwardly towards the outside of the tank and the channel member is seated on said downwardly sloping surface.

Further according to the invention the catching means may comprise a refractory member which slopes downwardly towards the outside of the tank. In another embodiment the refractory member overhangs a trough for receiving any caught impurities. The impurities either roll off the refractory member into the trough, or alternatively deposits on the refractory member may be scraped into the trough from time to time.

In yet another embodiment of the invention the sloping refractory member forms one face of a gutter in which caught impurities are collected.

The catching means may be so arranged along the tank side walls as to catch impurities falling from selected parts of the tank walls, for example those parts which are subject to considerable heat or scouring by the flow of gases from the burners.

In order that the invention may be more clearly understood some embodiments thereof showing the application of the invention to glass melting tanks, will now be described, by way of example, with reference to the accompanying diagrammatic drawings in which:

FIGURE 1 is a vertical section through a glass melting tank showing catching means according to the invention extending along the side walls of the tank, FIGURE 2 is an enlarged section through one side wall of the tank showing the catching means in greater detail, FIGURE 3 is a view similar to FIGURE 2 showing another construction of catching means in the side wall of a glass melting tank according to the invention, FIGURE 4 is a view similar to FIGURES 2 and 3 showing a third embodiment of catching means according to the invention, FIGURE 5 is a view similar to FIGURE 4 showing another embodiment of catching means which comprises a sloping flat refractory surface, and FIGURE 6 is an enlarged view of the catching means of FIGURE 5, showing the refractory surface in greater detail.

In the drawings the same references indicate the same or similar parts.

Referring to FIGURE 1 of the drawings, there is illustrated a glass melting tank according to the invention comprising a floor 1 and side walls of stepped construction. The left-hand side wall comprises a lower part 2 and an upper part 3 set back with respect to the lower part 2. Similarly the right-hand side wall comprises a lower part 4 and a set back upper part 5. The surface level of the molten glass 6 in the tank is indicated at 7, and the steps in the side walls lie in the region of the surface level 7 of the glass. The tank has an arched roof 8 and the upper parts 3 and 5 of the side walls are sufficiently high to provide a headspace 9 over the molten glass in the tank.

Granular glass forming materials are delivered to one end of the melting tank, as is well known, and are supported on the molten glass at that end. As the granular materials are advanced into the tank they are heated and melt to produce molten glass which is refined in a fining zone of the tank and is withdrawn from the tank over a forehearth at the other end of the tank.

The upper parts 3 and 5 of the tank side walls are each formed with a plurality of ports spaced along the side walls. One pair of oppositely disposed parts 10 and 11 is indicated in FIGURE 1 and the ports are fed alternately with hot air or gas through ducts 12 and 13 in well known manner.

In the tank illustrated there are oil burners 14 and 15 in the ducts 12 and 13 respectively. Each burner is supplied with oil fuel and when lit directs a flame into the headspace 9 over the molten glass. Only one of the oppositely disposed burners 14 and 15 is in use at a time.

The flames issuing from the ports in the side walls of the tank themselves cause scouring of the inside surfaces of the refractory blocks which make up the side wall parts 3 and 5, and there is additional scouring due to the hot gaseous currents which circulate rapidly in the headspace 9. This causes the release of refractory particles or glassy material from the refractory faces, and catching means are provided according to the invention to catch any such impurities falling from the upper parts 3 and 5 of the side walls and prevent them from contaminating the molten glass 6.

In the embodiment shown in FIGURE 1 and in greater detail in FIGURE 2 the surface 7 of the molten glass engages water-cooled boxes 16 and 17 which are respectively mounted on the top surfaces 18 and 19 of the lower parts 2 and 4 of the side walls. These water boxes 16 and 17 extend longitudinally of the side walls of the tank, and the top surfaces 18 and 19 of the steps formed in the tank side walls lie just below the level of the surface 7 of the molten glass.

The catching means on each step consists of an upwardly opening channel member, respectively 20 and 21, made of a refractory material, for example sillimanite, which members are so located on the step surfaces 18 and 19 that the inner faces of the upper parts 3 and 5 of the tank side walls overhang the channel members 20 and 21 and impurities falling from these faces of the side wall parts 3 and 5 are caught in the channel members 20 and 21.

This construction is illustrated in greater detail in FIGURE 2. A metal frame 22 provides support for a strut 23 supported by a bracket 24 against the refractory side wall part 2 of the tank beneath the level 7 of molten glass in the tank. The frame 22 includes an upper horizontal member 25 upon which a springer plate 26 is seated to afford support to a refractory springer block 27 and the block 27 together with a refractory superstructure block 28 seated on it constitutes the tank wall part 3 above the level 7 of molten glass in the tank.

The upwardly-opening, channel-shaped, refractory member 20 is retained in position on the top surface 18 of side wall part 2 behind the water box 16, by a metal clip 29 attached to the outer surface of the refractory wall 2.

With this arrangement impurities falling down the inside face of superstructure block 28 fall down the vertical face of the block 27 to drop from the lower edge thereof into the channel-shaped catching member 20.

The inside faces of the block 28 and the springer block 27 are exposed to the very high temperatures created within the headspace 9 and because the principal sources of impurity formation are chemical attack of the refractory by particles of the glass forming materials or condensates, or, in the case of electrocast refractories, exudation of glassy matrix, the impurities are generally of a liquid nature and great care must be taken in collecting these high temperature liquid impurities.

When a drop of liquid impurity falls from the lower edge of the springer block 27 there may be some splattering and the upwardly directed arms 30 of the channel-shaped member 20 are of sufficient height to prevent drops of the splattering liquid from jumping over the water box 17 into the liquid glass.

The high temperature of the impurities determines the type of catching surface which must be used, because if the impurities suffer a severe temperature drop when they fall on to a cool surface, i.e. if the impurities were to fall on to the water box 17, the impurities would be subjected to a very fast and uneven solidification which would cause the solidified impurities to shatter so that bits of the impurities would be thrown outwardly from the point of impact of the impurity drop.

However because the catching surface of the member 20 is a refractory collecting surface exposed to the headspace of the tank, the temperature of the collecting surface is in the region of that of the tank, and the temperature drop experienced by liquid impurities falling on to the catching surface is not severe, and a relatively slow and steady cooling of the impurities takes place.

Because the catching member 20 is supported on the top surface 18 of block 2 between water box 16 and the spring clip 29, it can be readily removed for cleaning, maintenance or replacement.

A modified arrangement is shown in FIGURE 3, in which the surface 18 of wall part 2 slopes downwardly away from the interior of the tank so that the catching surface defined by the inside bottom surface of the channel-shaped member 20 also slopes downwardly away from the interior of the tank. The arm 30 of the member 20 adjacent the water box 16 is still vertical to facilitate collection of the impurities although the other arm 30 slopes outwardly and by providing this inclined channel arrangement liquid impurities caught in the member 20 tend to flow towards the outside of the channel member 20 where they solidify, thereby leaving the inner catching region free so that splatter is reduced. Further, the tilting of the member 20 away from the tank interior also reduces the temperature within the channel-shaped member 20 without creating an undue temperature difference between the catching surface temperature and the tank temperature so that a setting of the liquid impurities without undue splattering is assured.

Another embodiment of the invention is shown in FIGURE 4. The refractory blocks 2 and 28 and springer block 27 are supported in identical manner to that shown in FIGURES 2 and 3. The surface 18 of wall part 2 slopes downwardly away from the interior of the tank, and the water box 16 presents a curved face 31 to the surface 7 of the molten glass. A flat refractory tile 32 is supported on top of the water box 16, the tile 32 being retained by a metal trough 33 which has a section extending upwardly into a gap 34 between the springer plate 26 and the springer block 27. The trough 33 is retained in position by a plate 35, and provides a support for the water box 16 as well as the tile 32.

The flat upper surface of tile 32 slopes downwardly away from the interior of the tank so that liquid impurities dropping on to the tile tend to flow down the top surface of the tile away from the molten glass 6 and into the trough 33 which is readily removable for cleaning. The inclination of the tile 32 also serves to reduce splattering of the impurities towards the molten glass and the thickness of the tile 32 is such that the top surface of the tile is substantially at tank temperature.

The lower inner edge of the springer block 27 is rounded, as indicated at 36, so that the liquid impurities do not fall from the block 27 in the plane of the inside face of the block 27 but run down the rounded lower edge 36 of the block 27 before falling on to the tile 32 so that the point of impact of the liquid impurities on the tile 32 is spaced towards the outside of the tank from the point of impact experienced with square cornered blocks 27.

FIGURES 5 and 6 show another embodiment of the invention wherein the springer block 27, the refractory block 28 and the side wall part 2 are arranged in the manner shown in FIGURES 3 and 4. The top surface 18 of the wall part 2 has a horizontal portion adjacent the molten glass and an inclined portion sloping downwardly away from the horizontal portion.

The surface 18 supports a water box 37 which follows the contour of the surface 18, i.e. the top and bottom walls of the water box 37 have horizontal and inclined portions parallel to the horizontal and inclined parts of the surface 18. The inclined portion of the top of the water box 37 supports a refractory tile 38 through the intermediary of an insulating layer 39 which serves to reduce the transfer of heat from the tile 38 to the water box 37. The supporting frame 22 includes a ledge 40 which constitutes an abutment for locating the lower side edge of the tile 38 and thereby retains the tile 38 in position.

The ledge 40 also supports refractory bricks 41 which greatly reduce the gap between the refractory tile 38 and the underside of the springer block 27 thereby constituting part of the tank walls, and the inside face of the bricks 41 in combination with the top surface of the tile 38 forms a gutter for collecting impurities caught by the tile 38.

When it becomes necessary to remove the accumulated impurities or to replace the tile 38 and/or bricks 41, the bricks 41 can be readily removed from outside the tank, being merely pulled out. The tile 38 can then be readily lifted over the ledge 40.

The refractory catching members 20, 32 and 38 are preferably formed from sillimanite, and the insulation layer 39 between the water box 37 and refractory member 38 is preferably a porous refractory material such as a porous silica. Similar insulation may also be provided between the water box 16 and the refractory members 20 and 32 in FIGURES 2, 3 and 4.

When the bricks 41 are formed from a porous refractory material, some of the liquid impurities may soak into the bricks 41 but this will not be detrimental to the life of the bricks 41 and may be an advantage in that the quantity of impurities which can be received by the gutter assembly will be increased and thereby the effective life of the impurity catching assembly will increase.

Catching means according to the invention may be applied to selected wall sections or, when the tank structure permits, to the entire wall structure so as to surround the liquid. However, in a glass melting tank of the kind described above the feeding arrangement for granular materials to the tank and the glass discharge arrangement may restrict the use of the invention to the side walls of the tank.

What is claimed is:

1. A glass melting tank having side walls each consisting of a lower part constituting side walls of a container of molten glass and an upper part extending upwardly to the crown of the tank, which upper parts are set back with respect to the lower side wall parts which provide steps beneath the inner surfaces of the upper side wall parts, removable catching means mounted on the top surfaces of the steps so formed in the tank side walls for catching any impurity falling from the inner surfaces of the upper side wall parts, and closure means in the tank side walls behind said steps to permit access to the removable catching means.

2. A glass melting tank comprising walls each consisting of a lower part constituting the side walls for containing molten glass in the tank and upper parts extending upwardly and supporting the crown of the tank, the upper side wall parts being set back with respect to the lower side wall parts which provide steps beneath the inner surfaces of the upper side wall parts, removable catching means mounted on the top surfaces of the lower side wall parts for catching any impurity falling from the upper side wall parts, cooling means for said removable catching means, and closure means in the tank side walls behind the top surfaces of the lower side wall parts to permit removal and replacement of the catching means.

3. A glass melting tank according to claim 2, wherein said cooling means comprises water boxes extending longitudinally of the tank side walls on each of said steps inwardly of the tank so as to be engaged by molten glass in the tank, and the removable catching mean is mounted on each of the steps behind the water box on that step.

4. A tank according to claim 3, wherein each removable catching means consists of an upwardly opening channel member so located on the step that the inner surfaces of the respective upper side wall parts overhang the channel members, the inner upwardly directed arm of each channel member being in thermal contact with the adjacent water box, and the height of that arm being sufficient to present a barrier to impurities splattering on the cooled channel member.

5. A tank according to claim 4, wherein the outer part of the surface of each step behind the water box on that step slopes downwardly towards the outside of the tank, and each channel member is shaped so as to be seated on its downwardly sloping step surface with its inner arm remaining in thermal contact with the water box.

6. A tank according to claim 2, wherein the top surface of each step slopes downwardly towards the outside of the tank, and each said catching means comprises a refractory tile mounted on that sloping surface.

7. A tank according to claim 6, wherein a water box having a downwardly sloping upper surface is mounted on the slope of each said top surface, and the refractory tiles are mounted on the top surfaces of the water boxes.

8. A tank according to claim 6, wherein a trough for receiving caught impurities is formed behind the step in each side wall of the tank, and the lower edge of the refractory tile on each step overhangs the trough.

9. A tank according to claim 6, wherein the lower edges of the refractory tiles respectively abut the bottoms of the inner faces of the upper side wall parts to form therewith gutters in which caught impurities are collected.

10. A tank according to claim 1, wherein at least certain of said removable catching means are channel shaped.

References Cited

UNITED STATES PATENTS

| 1,872,477 | 8/1932 | Mambourg | 65—347 X |
| 1,970,944 | 8/1934 | Ross et al. | 263—46 |
| 2,263,848 | 11/1941 | Keaney | 263—46 |
| 3,275,430 | 9/1966 | Beattie | 65—204 |

FREDERICK L. MATTESON, JR., *Primary Examiner.*

JOHN J. CAMBY, *Assistant Examiner.*